United States Patent [19]

Chaveneaud et al.

[11] 3,717,232
[45] Feb. 20, 1973

[54] STEP-BY-STEP DRIVING DEVICE

[75] Inventors: Roger M. Chaveneaud, 92 Levallois-Perret; Georges Janoska, 92 Courbevoie, both of France

[73] Assignee: Societe A Responsabilite Limitee Dite: Societe Lamy D'Etude et de Recherches, Courbevoie (Seine), France

[22] Filed: March 15, 1971

[21] Appl. No.: 124,040

[52] U.S. Cl. .................. 192/142 R, 74/84, 74/436
[51] Int. Cl. .................................. F16d 71/00
[58] Field of Search ....... 192/2, 142 R, 142 A; 74/84, 74/435, 436

[56] References Cited

UNITED STATES PATENTS

| | | | |
|---|---|---|---|
| 2,409,895 | 10/1946 | Phelps | 192/142 A |
| 2,535,490 | 12/1950 | Emrick | 192/2 |
| 2,554,981 | 5/1951 | Goff | 74/84 |
| 3,495,693 | 2/1970 | Limberger | 192/148 |
| 3,520,391 | 1/1968 | Graham et al. | 192/142 R |

*Primary Examiner*—Allan D. Herrmann
*Attorney*—Finnegan, Henderson & Farabow

[57] ABSTRACT

The invention relates to a step-by-step driving device comprising a driving shaft and a driven shaft connected by means transforming the rotary movement of the driving shaft into an intermittent rotary movement of the driven shaft, and means connected to the driving shaft in order to interrupt its rotation, this realization comprising in addition a bistable rotary switch driven by the driving shaft to change the switch from one state to the other depending on the angular position of this driving shaft, this switch controlling the means connected to the driving shaft in order to interrupt its rotation when the rotary switch is positioned angularly in relation to the driving shaft in order to pass from one state to the other and interrupt the drive of the driving shaft when the driven shaft is still.

9 Claims, 9 Drawing Figures

STEP-BY-STEP DRIVING DEVICE

The invention relates to a step-by-step driving device.

Make and break devices made up of mechanical components ensuring transformation of a continuous rotary movement of a driving shaft into an intermittent rotary movement of a driven shaft are already known.

With these devices, the various stop positions or the various immobilization paces of the driven shaft have a specific angular position, but the duration of these stops is closely linked to the speed of rotation of the driving shaft.

Likewise, if a means is provided for interrupting the rotation of the driving shaft, the time of passage from one stop position of the driven shaft to the following stop position may vary, depending on whether the driving shaft stop is determined while the driven shaft is rotating or still.

In effect, if the driven shaft is rotating at the moment when the driving shaft stop is determined, variations occur in the rotation of the driving shaft and driven shaft at the following start which depend on the time taken by the driving shaft to reach its normal speed of rotation, and on the charge that might be on the driven shaft.

On the other hand, if the driving shaft stop is determined when the driven shaft is still, in this case neither the time taken by the driving shaft to reach its normal speed of rotation nor the charge on the driven shaft influences the angular position of the driving shaft in terms of time.

The object of this invention is to remedy these drawbacks and for this purpose it relates to a step-by-step driving device characterized by comprising a driving shaft and a driven shaft connected by means transforming the rotary movement of the driving shaft into an intermittent rotary movement of the driven shaft, means connected to the driving shaft in order to interrupt its rotation and a bistable switch driven or controlled by the driving shaft to change the switch from one state to the other depending on the angular position of this driving shaft, this switch controlling the means connected to the driving shaft in order to interrupt its rotation and the switch being positioned in relation to the driving shaft in order to pass from one state to the other and interrupt the drive of the driving shaft when the driven shaft is still.

In accordance with another characteristic, a means of control is connected to the device interrupting the rotary drive of the driving shaft, said means of control cancelling the order from the switch for the driving shaft to stop.

In accordance with another characteristic, the bistable switch and the means of control, which determine the stop and rotation of the driving shaft during the driven shaft stops, constitute for the means of control a device giving an impulse to start the driving shaft rotating, and for the bistable switch a means ensuring maintenance of rotation of the driving shaft in one state, and stopping of the rotation of this driving shaft in its other state.

The invention is illustrated as non-limiting examples in the accompanying drawings, in which.

Figure 7C:
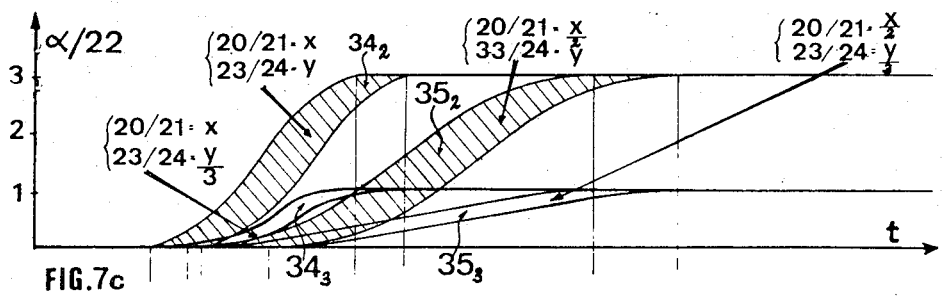
Figure 7B:
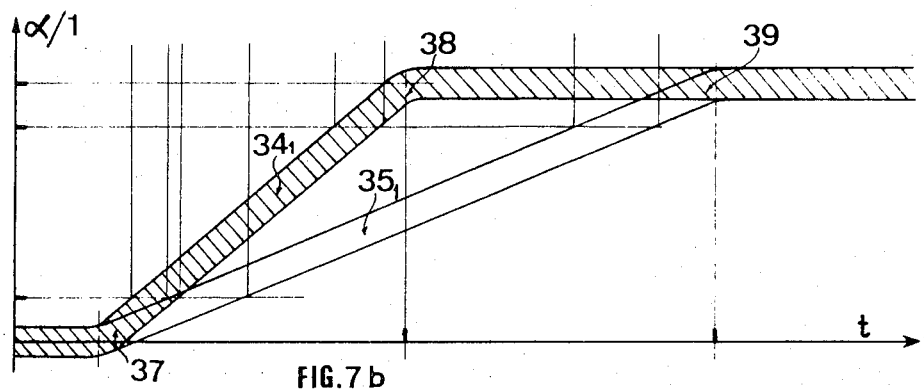
Figure 7A:
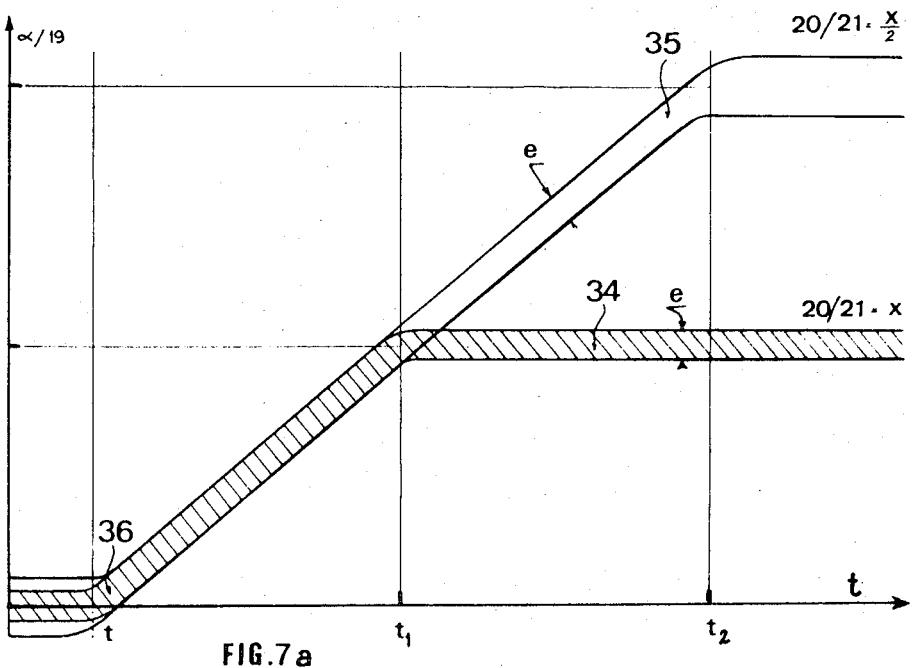

FIGS. 7a, 7b, 7c, graphs corresponding to each other, show respectively diagrams in terms of the rhythm of the driving shaft rotation, the driving shaft and the outlet shaft.

Consequently, the object of this invention is, generally speaking, the realization of a device enabling strictly accurate angular positions to be determined, wherein the duration of holding in these angular positions and the time taken to pass from one of these positions to the other may be of any length and independent from each other.

The invention device may therefore be used in any kind of programmed control device.

Figure 1:
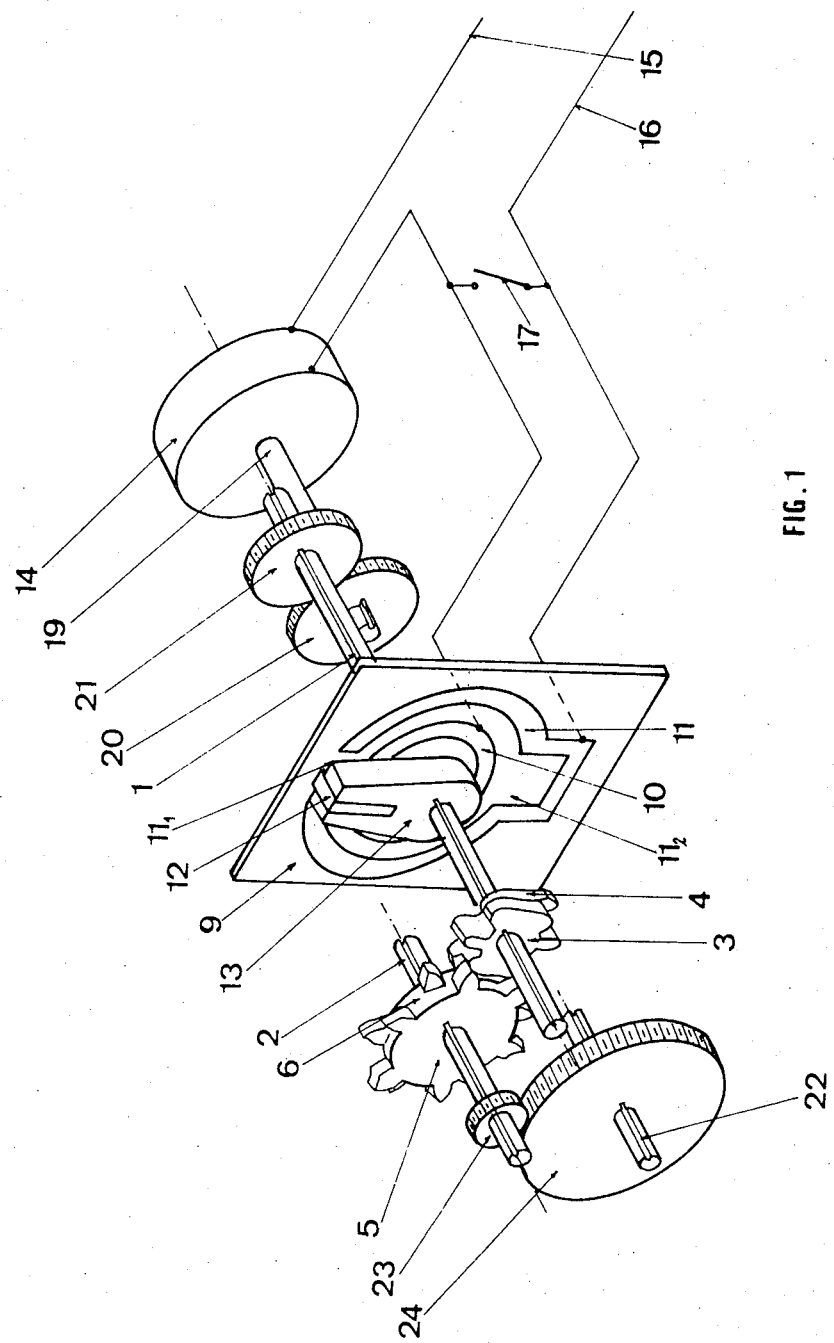
FIG. 1 shows in perspective a first embodiment of the invention constituting a programmed control device.

In FIG. 1, a device is shown comprising a driving shaft 1 and a driven shaft 2 connected by means of a device transforming the continuous rotary movement of the driving shaft 1 into an intermittent rotary movement of the driven shaft 2.

This device, which is already known, may be of any kind, but in the example illustrated it is made up of (see FIGS. 1 and 2) four pinions, two of which, 3 and 4, are fixed coaxially to the driving shaft 1 and the others, 5 and 6, are fixed coaxially on the driven shaft 2.

In this example pinions 3 and 4 and pinions 5 and 6 are produced in a single part.

Figure 2:
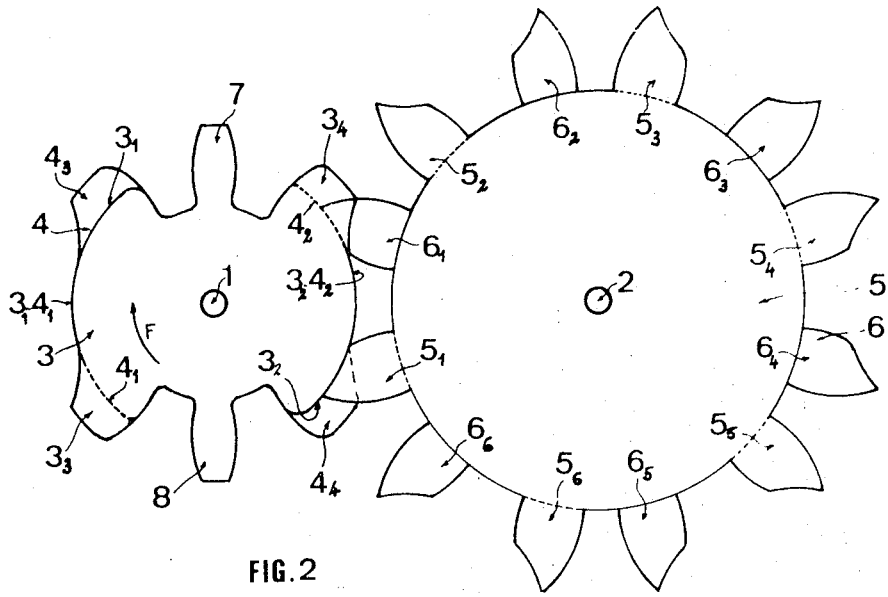
FIG. 2 is an embodiment example of a device transforming a continuous rotary movement into an intermittent movement.

As shown in more detail in FIG. 2, pinions 3 and 4 positioned on driving shaft 1 have smooth circular zones, holding the driven shaft 2 still when these circular surfaces co-operate with one of the pairs of teeth $5_1$, $6_1, 5_2, 6_2 \ldots 5_6, 6_6$, on pinions 5 and 6.

In this embodiment, pinions 3 and 4 on driving shaft 1 each have two smooth circular zones $3_1$, $3_2$ and $4_1$, $4_2$, which therefore determine two stop positions for driven shaft 2 by rotation of driving shaft 1. In addition, in this example, as the driven shaft has six pairs of teeth $5_1$, $6_1$ . . . driven shaft 2 will make one revolution for each three by the driving shaft.

When shaft 1 turns in the direction of the arrow F, tooth 7, common to both pinions 3 and 4, drives shaft 2 by tooth $6_1$ on pinion 6 until the circular surface $3_1$ comes into contact with the curved apex of tooth $5_2$ and at the same time the smooth circular surface $4_1$ on pinion 4 comes into contact with the curved apex of tooth $6_2$ on pinion 6.

The rotation of shaft 1 thus continues while shaft 2 is still, until tooth 8 meshes between teeth $6_2$ and $5_3$ to cause shaft 2 to stop again while the curved ends of teeth $5_3$ and $6_3$ are opposite the smooth circular surfaces $3_2$ and $4_2$ respectively.

It will be noted (see in particular FIG. 2) that pinions 3 and 4 on driving shaft 1 are provided with bosses $3_3$, $3_4$ on pinion 3, and $4_3$, $4_4$ on pinion 4. These bosses act as cams and have a rounded peripheral surface specifically to produce an acceleration or deceleration of the drive of pinions 5 and 6 before or after teeth 7 and 8 co-operate with the pairs of teeth $5_1$, $6_1$, etc.

In accordance with the invention, a bistable rotary switch is controlled by driving shaft 1, to ensure that driving shaft 1 stops while driven shaft 2 is still, that is to say when this driven shaft 2 is not under charge.

In this way, this device allows the length of stops by shaft 2 to be varied in any way whatsoever, yet maintaining the specific angular position of these stops, and without the uncertainties resulting from the inertia of the driving shaft and the importance of the load on the driven shaft being able to influence these angular positions in terms of time. This bistable switch may be of any kind whatsoever — electronic, magnetic, mechanical, optical, etc. — and, in the example in FIG. 1 an electric rotary switch is shown, comprising a fixed support 9 having conducting tracks 10 and 11 and a contact plug 12 which, in certain angular positions, forms the electrical connection between tracks 10 and 11.

This plug 12 is fixed on the end of an arm 13 assembled on driving shaft 1.

In accordance with the invention, in this switching device, plug 12 and tracks 10 and 11 are positioned angularly in relation to each other and in relation to driving shaft 1, so that plug 12 interrupts the electrical connection between tracks 10 and 11 when driven shaft 2 is still.

In this way, in the example shown, pinions 3, 4 and 5, 6 are fixed so as to effect two stops of driven shaft 2 per revolution of driving shaft 1; consequently, the switching device has on track 11 two non-conducting zones $11_1$, $11_2$, which are positioned in relation to plug 12, that is to say in relation to driving shaft 1 so as to interrupt the rotation of this driving shaft when the driven shaft is still.

In the example shown in FIG. 1, the driving component 1 is driven in rotation by an electric motor shown diagrammatically at 14 whose feed-circuit, comprising conductors 15 and 16, passes through tracks 10 and 11 and through plug 12.

It will, however, be understood that this electric motor 14 is only one embodiment example and may be replaced by any similar device driving the shaft 1.

In this way, this electric motor 14 may comprise an outlet shaft from a machine such as a machine-tool and in this case the switching device 10, 11, 12 will comprise a means adapted to interrupt the mechanical connection between this arm of the machine and driving shaft 1.

With driving shaft 1 being so stopped, it is possible, in accordance with the invention, to start rotation of driving shaft 1 by using a switching device cancelling the order to stop communicated by the bistable switch 10, 11, 12.

In the example illustrated in FIG. 1, this switching device comprises a switch 17 mounted in parallel on switch 10, 11, 12.

Figure 3:
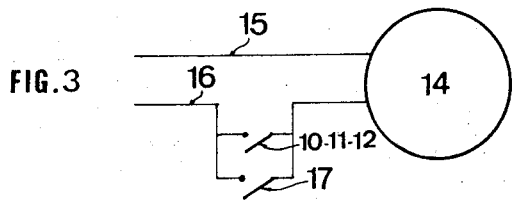
FIG. 3 is an electrical diagram corresponding to the construction in FIG. 1.

The electrical diagram for feeding motor 14 is then that illustrated in FIG. 3.

It will be further noted that in the example in FIG. 1, track 11 ensures self-feeding of motor 14 during rotation of driving shaft 1, so that in order to cause motor 14 to start rotating, all that is necessary is to cause an impulse, via switch 17, to bring plug 12 into contact with tracks 10 and 11, the feeding of motor 14 then continuing via plug 12.

Consequently, it will be noted that the device in accordance with the invention does not require a calibrated start-up impulse to begin operating, since the end of this impulse may occur at any time while plug 12 is connecting tracks 10 and 11. This start-up impulse may be obtained by any means whatsoever, either by a manual control or by one synchronous with the operation of any sort of apparatus or machine, or yet again by a programmed control. This impulse may likewise result from a temporized control.

The device in accordance with the invention also enables different sources of energy to be provided, on the one hand to determine the stopping of driving shaft 1, on the other hand to ensure start-up of this shaft and, in this case, the start-up impulse is brought to the motor via a switch likewise positioned angularly in relation to driving shaft 1.

Figure 5:
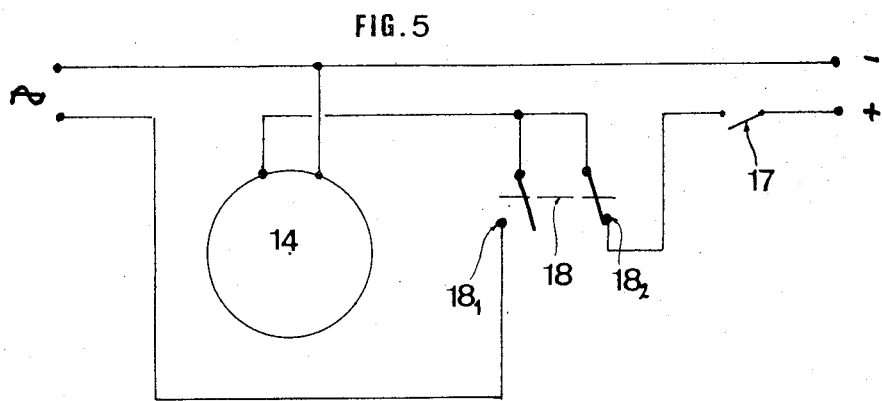
FIG. 5 is the electrical diagram for the device in FIG. 4.

In the electrical diagram shown in FIG. 5, a device is illustrated in which normal feeding of the motor is obtained from an alternating current power source, while the start-up impulse is given from a direct current electricity source via a switch such as 17.

In this case, switch 10, 11, 12 is replaced by a two-way switch 18 which, through its contact $18_1$, enables motor 14 to be stopped or self-fed from the alternative current electrical source and, through its contact $18_2$, enables another circuit feeding motor 14, comprising the direct-current electrical source with its component 17 that produces the start-up impulse, to be closed.

Thus, when driven shaft 2 is stopped, the switch 18 wedged on the driving shaft is in a position such that contact $18_2$ is closed to allow motor 14 to start up through an impulse from switch 17.

When motor 14 begins operating, switch 18 rotates into its second position, so as to open its contact $18_2$ in order to prevent the motor being fed by the direct current source and to close its contact $18_1$ in order to allow self-feeding of the motor from the alternative current source until the following stop of the driven shaft, for which contact $18_2$ will again be closed and contact $18_1$ re-opened.

Figure 4:
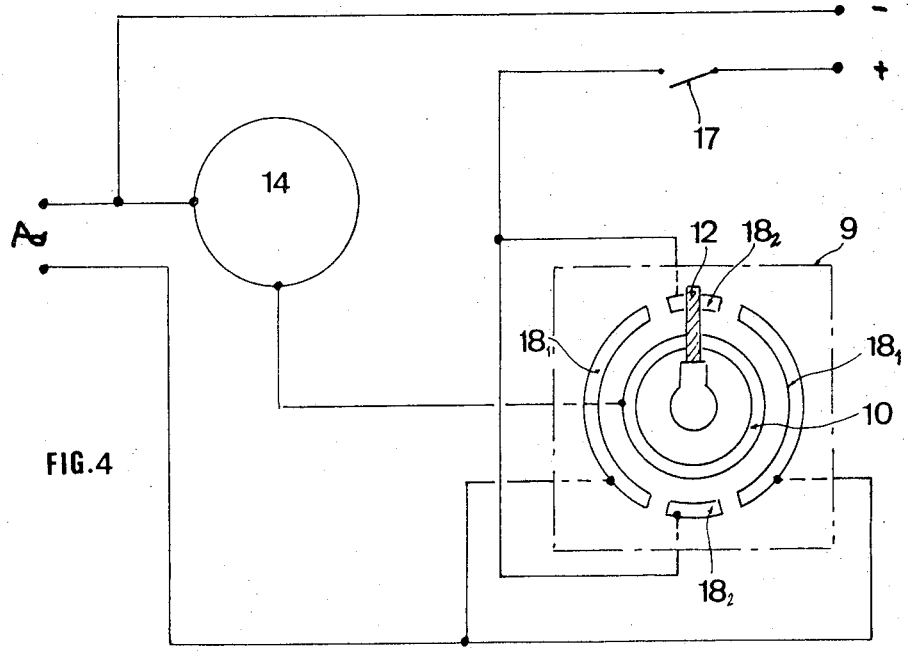
FIG. 4 is a modified example of the device in FIG. 1.

In the embodiment illustrated in FIG. 4, the two-way switch 18 is realized on a same support such as 9 comprising an annular track 10 and annular tracks $18_1$, $18_2$.

In accordance with the invention, driving shaft 1 may be connected to the driving component such as 14 by a main shaft 19 and a gear-train with two pinions 20 and 21 assembled respectively on main shaft 19 and driving shaft 1.

This gear-train, which may to advantage be interchangeable, will then allow the speed of rotation of driving shaft 1 to be adapted in order to vary the length of time taken by driven shaft 2 to pass from one immobilization step to the other.

Likewise, driven shaft 2 may be connected to an outlet shaft 22 via a gear-train comprising pinions 23, 24 assembled respectively on driven shaft 2 and on an outlet shaft 22.

The relationship between these gears, which may to advantage be interchangeable, enables the number of immobilization steps for outlet shaft 22 to be adapted per revolution of this shaft depending on the desired realization.

In accordance with the invention, this device also enables any control order whatsoever to be produced from driven shaft 2 or from outlet shaft 22, after these shafts are still, and also enables production of this control order to be stopped before these shafts have restarted moving.

Figure 6:
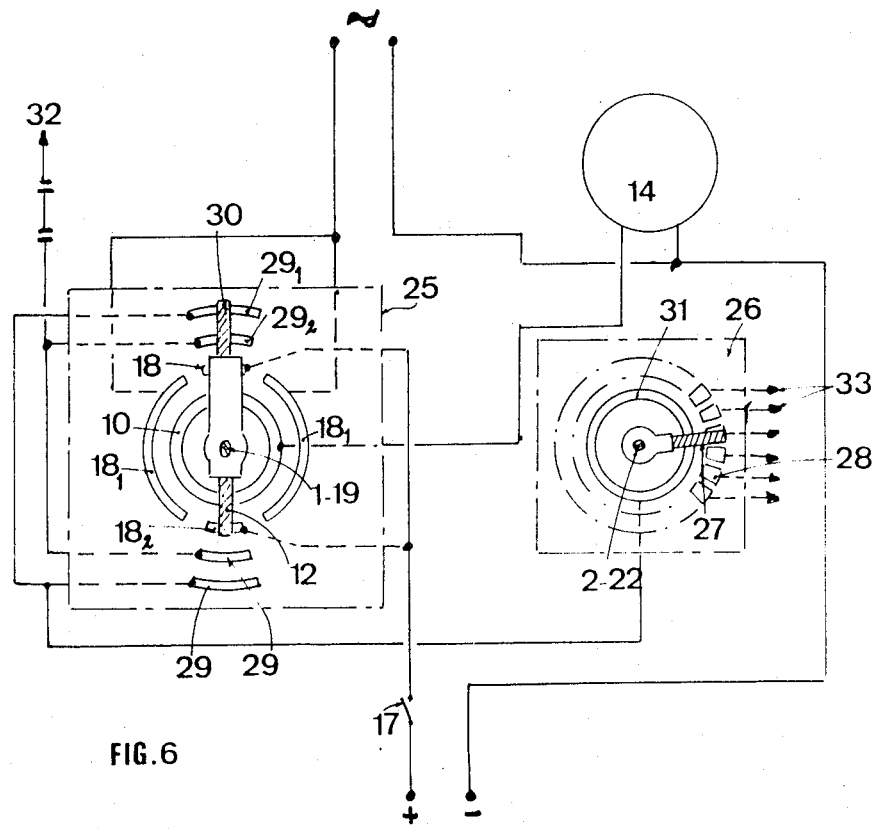
FIG. 6 shows another embodiment of the device in accordance with the invention.

Such an embodiment is illustrated in FIG. 6, which comprises a switch 25 positioned angularly on driving shaft 1 or on main shaft 19 and a multipolar rotary switch 26 positioned angularly on driven shaft 2 or outlet shaft 22, in such a way that plug 27 on this switch 26 stops on one of the fixed plugs 28 before driving shaft 1 or main shaft 19 is still.

In relation to the embodiment in FIG. 4 the support 25 has in addition fixed plugs $29_1$, $29_2$ positioned angularly in relation to a plug 30 to ensure closing of the electrical circuit to plugs $29_1$, $29_2$ when driving shaft 1 or main shaft 19 is stopped.

These plugs $29_1$, $29_2$ are arranged in series in a control circuit comprising the common circular track 31 of switch 26 and the various plugs 28 of this switch.

In this way, between the ends 32 and 33 of the variously-used control circuits, the closing of this control circuit by plugs $29_1$, $29_2$ is effected only when driven shaft 2 or outlet shaft 22 is stopped, that is to say after plug 27 is immobilized on one of the plugs 28.

Through the clearance of outlet gears 23, 24, this arrangement therefore allows the plugs 28 on switch 26 to be multiplied without risking that plug 27 establishes a connection between two plugs 28, since the connecting of plugs 27, 28 is effected before that of plugs $29_1$, $29_2$.

The three diagrams in FIGS. 7a, 7b, 7c illustrate the operation and the result of the device in accordance with the invention.

In the diagram in FIG. 7a, times are shown on the x-axis and angles on the y-axis for rotation of the main shaft 19. The two curves 34 and 35 correspond, for curve 34 to a ratio $x$ between gears 20 and 21, and for curve 35 to a ratio $x/2$ between these two gears.

It will be noted that after a period of acceleration of the main shaft at 36, rotation continues at constant speed until time $t_1$ when cutting of the current, caused by the separation of a track $18_1$ and track 10 by plug 12, determines the stopping of the motor 14.

However, in the case of gears 20 and 21 being equal in ratio to $x/2$, rotation of the motor occurs until a time $t_2 = 2t_1$, the main shaft obviously having traversed an angle double that of the preceding case (ratio equal to $x$).

It will likewise be noted that in either case, there is an area of uncertainty as regards the angular position of main shaft 19 at all times. This uncertainty is illustrated by the thickness $e$ of curves 34 and 35.

Upon examining the curve in FIG. 7b, which illustrates the angular variation of driving shaft 1 as a function of time, two curves $34_1$, $35_1$ will be found, having the same uncertainties at 37 for acceleration of the shaft 1 and at 38 and 39 for deceleration of this shaft as well as the same uncertainty in the angular position of this shaft 1 at all times when it rotates and when it stops.

On the other hand, upon examining the curve 7c, which illustrates the angular position of outlet shaft 22 as a function of time, two curves $34_2$, $35_2$ are obtained for the same ratio Y of gears 23 and 24, depending on whether the ratio of gears 20 and 21 is respectively equal to $x$ or to $x/2$.

However, in either of these cases, the outlet shaft 22 positions itself at a specified angular value at the moment of stopping while the time taken to pass from one step to the other varies according to the ratio of pinions 20 and 21.

On the other hand, if gears 23 and 24 are given a ratio Y/3, the angle of rotation of outlet shaft 22 is divided by three in relation to the preceding case and curves $34_3$ and $35_3$ are obtained, depending on whether the ratio of gears 20 and 21 is equal to $x$ or to $x/2$ respectively.

It is therefore effectively noted that the variation in ratio of gears 20 and 21 enables the speed for passage from one stopping pace of outlet shaft 22 to the other to be modified, while modification of the ratio of gears 23, 24 enables the angular position of the stops of outlet shaft 22 to be modified, these various angular positions being in all cases determined specifically to produce a programmed control.

It should be understood that the invention is not limited to the embodiments described and presented hereinabove; from these it is possible to foresee other forms and embodiments which in no way exceed the scope of the invention.

What is claimed is:

1. A step-by-step driving device comprising a driving shaft and a driven shaft connected by means for transforming rotary movement of the driving shaft into an intermittent rotary movement of the driven shaft, and means connected to the driving shaft for interrupting its rotation, this means comprising bistable rotary switching means driven by the driving shaft to change said rotary switching means from one state to the other depending on the angular position of said driving shaft, said rotary switching means controlling drive means connected to the driving shaft in order to interrupt its rotation when the rotary switching means is positioned in relation to the driving shaft in order to pass from one state to the other and interrupt the drive of the driving shaft when the driven shaft is still, and pulse control means for cancelling the order to stop the driving shaft from the rotary switching means.

2. A device in accordance with claim 1, characterized by the bistable rotary switching means and the pulse control means, which determine the stop and rotation of the driving shaft during the driven shaft stops, constituting for the pulse control means a device giving an impulse to start the driving shaft rotating, and for the bistable rotary switching means a switch ensuring maintenance of rotation of the driving shaft in one state, and stopping of the rotation of this driving shaft in its other state.

3. A device in accordance with claim 1, characterized by the bistable rotary switching means controlled by the driving shaft comprising a rotary switch having a mobile contact part driven by the driving shaft and coming into contact with a fixed contact part, the mobile contact being oriented in relation to the fixed contact and in relation to the angular position of the driving shaft in order to open this switch when the driven shaft is rotating and close this switch when the driven shaft is still.

4. A device in accordance with claim 1, characterized by the driving shaft being driven by an electric motor, the bistable rotary switching means connected with the driving shaft in order to interrupt its drive being made up of an electric switch inserted in the feed circuit of said motor.

5. A device in accordance with claim 1, characterized by the bistable switching means being connected to the driven shaft, the switch positions of said means being oriented in relation to the driven shaft in order to ensure a state of change when the driven shaft is still.

6. A device in accordance with claim 5, characterized by the driving shaft being connected to a rotary switch having switching plugs connected electrically to rotary switching circuits connected to the driven shaft, the switching positions of the switch connected to the driving shaft being oriented in relation to this driving shaft in order to allow the closing of a circuit by one of the switching plugs connected to the driven shaft only when this driven shaft is still.

7. A device in accordance with claim 6, characterized by the switch connected to the driving shaft and determining, when the driven shaft is still, for one the interruption of rotation of the driving shaft and for the other the closing of a circuit on one of the switching plugs connected to the driven shaft, being made up of one and the same fixed support fitted with conducting tracks co-operating with plugs connected to the driving shaft.

8. A device in accordance with claim 1, characterized by the driving shaft being connected to a main shaft via a gear-train.

9. A device in accordance with claim 1, characterized by the driven shaft being connected to an outlet shaft via a gear-train.

* * * * *